(12) United States Patent
Chen et al.

(10) Patent No.: US 12,477,102 B2
(45) Date of Patent: Nov. 18, 2025

(54) DEVICE AND METHOD FOR CODING VIDEO DATA

(71) Applicant: SHARP KABUSHIKI KAISHA, Sakai (JP)

(72) Inventors: Chih-Yuan Chen, Taipei (TW); Chih-Yu Teng, Taipei (TW); Yu-Chiao Yang, Taipei (TW)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 18/695,705

(22) PCT Filed: Sep. 27, 2022

(86) PCT No.: PCT/CN2022/121802
§ 371 (c)(1),
(2) Date: Mar. 26, 2024

(87) PCT Pub. No.: WO2023/051541
PCT Pub. Date: Apr. 6, 2023

(65) Prior Publication Data
US 2025/0008083 A1  Jan. 2, 2025

Related U.S. Application Data

(60) Provisional application No. 63/249,492, filed on Sep. 28, 2021.

(51) Int. Cl.
*H04N 19/105* (2014.01)
*H04N 19/176* (2014.01)

(52) U.S. Cl.
CPC ......... *H04N 19/105* (2014.11); *H04N 19/176* (2014.11)

(58) Field of Classification Search
CPC .. H04N 19/105; H04N 19/176; H04N 19/109; H04N 19/52
See application file for complete search history.

(56) References Cited

U.S. PATENT DOCUMENTS

| 2020/0068218 A1* | 2/2020 | Chen ............... H04N 19/82 |
| 2020/0162743 A1 | 5/2020 | Park et al. |
| 2021/0037238 A1 | 2/2021 | Park et al. |

FOREIGN PATENT DOCUMENTS

| WO | 2019199071 A1 | 10/2019 |
| WO | 2020009427 A1 | 1/2020 |

OTHER PUBLICATIONS

Adrian Browne et al., "Algorithm description for Versatile Video Coding and Test Model 14 (VTM 14)", JVET-W2002-v1, Joint Video Experts Team (JVET) of ITU-T SG 16 WP 3 and ISO/IEC JTC 1/SC 29, 23rd Meeting, by teleconference, Jul. 7-16, 2021.

(Continued)

*Primary Examiner* — Hesham K Abouzahra
(74) *Attorney, Agent, or Firm* — ScienBiziP, P.C.

(57) ABSTRACT

A method of encoding video data is provided. The method determines a block unit of an image frame of the video data. The method determines, for the block unit, a first merge candidate list including multiple merge candidates, and identifies multiple merge subgroups from the first merge candidate list. The method determines multiple first cost values each corresponding to one of the merge candidates, and determines an arrangement of the merge candidates in each of the merge subgroups based on the first cost values. The method determines a second merge candidate list by selecting, from each of the merge subgroups, a first K merge candidates of the merge candidates ordered based on the arrangements. Then, the method selects one of the merge candidates in the second merge candidate list to predict the (Continued)

block unit and encodes one or more merge indices into a bitstream based on the selected merge candidate.

17 Claims, 5 Drawing Sheets

(56) References Cited

OTHER PUBLICATIONS

Benjamin Bross et al., "Versatile Video Coding (Draft 10)", JVET-S2001-vG, Joint Video Experts Team (JVET) of ITU-T SG 16 WP 3 and ISO/IEC JTC 1/SC 29/WG 11, 19th Meeting: by teleconference, Jun. 22-Jul. 1, 2020.

"Series H: Audiovisual and Multimedia Systems Infrastructure of audiovisual services—Coding of moving video, High efficiency video coding", ITU-T H.265 (Aug. 2021).

"Series H: Audiovisual and Multimedia Systems Infrastructure of audiovisual services—Coding of moving video, Versatile video coding", ITU-T H.266 (Aug. 2020).

Muhammed Coban et al., "Algorithm description of Enhanced Compression Model 2 (ECM 2)", JVET-W2025, Joint Video Experts Team (JVET) of ITU-T SG 16 WP 3 and ISO/IEC JTC 1/SC 29, 23rd Meeting, by teleconference, Jul. 7-16, 2021.

Benjamin Bross et al., "Versatile Video Coding Editorial Refinements on Draft 10", JVET-T2001-v2, Joint Video Experts Team (JVET) of ITU-T SG 16 WP 3 and ISO/IEC JTC 1/SC 29, 20th Meeting, by teleconference, Oct. 7-16, 2020.

Na Zhang et al., "EE2-3.1/EE2-3.2: Adaptive Reordering of Merge Candidates with Template/Bilateral Matching", JVET-W0090-v2, Joint Video Experts Team (JVET) of ITU-T SG 16 WP 3 and ISO/IEC JTC 1/SC 29, 23rd Meeting, by teleconference, Jul. 7-16, 2021.

Jianle Chen et al., "Algorithm description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020.

Taichiro Shiodera et al: "TE6 subset a: Bidirectional intra prediction", JCTVC-C079, Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010.

\* cited by examiner

DEVICE AND METHOD FOR CODING VIDEO DATA

CROSS-REFERENCE TO RELATED APPLICATION(S)

This application is a National Stage application of International Patent Application Serial No. PCT/CN2022/121802, filed on Sep. 27, 2022, which claims the benefit of and priority to U.S. Provisional Patent Application Ser. No. 63/249,492, filed on Sep. 28, 2021, the contents of all of which are hereby incorporated herein fully by reference in their entirety for all purposes.

FIELD

The present disclosure is generally related to video coding and, more specifically, to techniques for arranging and selecting multiple merge candidates in a merge candidate list.

BACKGROUND

Merge mode is a coding tool for video coding. In a conventional video coding method, an encoder and a decoder may predict and reconstruct a block unit in an image frame by using motion information of multiple previously reconstructed samples to point to a reference block in different image frame to generate a prediction block for predicting the block unit.

However, the motion information of the previously reconstructed samples may be select from a lot of merge candidates. If each of the merge candidates is detailed estimated for determining a difference degree between the block unit and a reference block determined from a corresponding one of the merge candidates, it may waste a lot of time to encode a video and decode a bitstream. Therefore, the encoder and the decoder may need a candidate selection method for predicting or reconstructing the block unit more efficiently.

SUMMARY

The present disclosure is directed to an electronic device and method for selecting one of multiple merge candidates for a block unit in an image frame by using a template matching to arrange the merge candidates.

In a first aspect of the present disclosure, a method of encoding video data and an electronic device for performing the method are provided. The method includes receiving the video data; determining a block unit from an image frame included in the video data; determining, for the block unit, a first merge candidate list including multiple merge candidates; identifying multiple merge subgroups from the first merge candidate list, wherein a number of the multiple merge candidates in each of the multiple merge subgroups is equal to or less than N, N being a first positive integer; determining multiple first cost values each corresponding to one of the multiple merge candidates; determining an arrangement of the multiple merge candidates in each of the multiple merge subgroups based on the multiple first cost values; determining a second merge candidate list by selecting, from each of the multiple merge subgroups, a first K merge candidates of the multiple merge candidates ordered based on the arrangements, K being a second positive integer less than N; and selecting one of the multiple merge candidates in the second merge candidate list to predict the block unit and encoding one or more merge indices into a bitstream based on the selected one of the multiple merge candidates.

In another implementation of the first aspect, each of the multiple first cost values is a template matching cost value determined based on multiple first reconstructed samples in multiple neighboring regions neighboring the block unit and multiple second reconstructed samples determined based on a corresponding one of the multiple merge candidates.

In another implementation of the first aspect, the multiple merge candidates in each of the multiple merge subgroups are ordered in an ascending order of the multiple first cost values.

An implementation of the first aspect further includes determining multiple second cost values each corresponding to one of the multiple merge candidates in the second merge candidate list, wherein the multiple second cost values are different from the multiple first cost values; determining the selected one of the multiple merge candidates based on the multiple second cost values; and determining the one or more merge indices for indicating the selected one of the multiple merge candidates.

In another implementation of the first aspect, each of the multiple second cost values is determined based on the block unit and multiple third reconstructed samples determined based on a corresponding one of the multiple merge candidates.

In another implementation of the first aspect, a first one of the one or more merge indices indicates which one of the multiple merge subgroups includes the selected one of the multiple merge candidates, and a second one of the one or more merge indices indicates which one of the multiple merge candidates is the selected one of the multiple merge candidates in the one of the multiple merge subgroups.

In a second aspect of the present disclosure, a method of decoding a bitstream and an electronic device for performing the method are provided. The method includes receiving the bitstream; determining a block unit from an image frame and one or more merge indices of the block unit according to the bitstream; selecting, based on a first one of the one or more merge indices, one of multiple merge subgroups identified from a merge candidate list of the block unit, wherein: each of the multiple merge subgroups includes multiple merge candidates, and a number of the multiple merge candidates in each of the multiple merge subgroups is equal to or less than N, N being a positive integer; determining multiple cost values each corresponding to one of the multiple merge candidates in the selected one of the multiple merge subgroups; determining an arrangement of the multiple merge candidates in the selected one of the multiple merge subgroups based on the cost values; selecting, from the selected one of the multiple merge subgroups based on a second one of the one or more merge indices, one of a first K merge candidates of the multiple merge candidates ordered based on the arrangement, K being a second positive integer less than N; and reconstructing the block unit based on the selected one of the first K of the multiple merge candidates.

In another implementation of the second aspect, each of the multiple cost values is a template matching cost value determined based on multiple first reconstructed samples in multiple neighboring regions neighboring the block unit and multiple second reconstructed samples determined based on a corresponding one of the multiple merge candidates in the selected one of the multiple merge subgroups.

In another implementation of the second aspect, the multiple merge candidates in the selected one of the multiple merge subgroups are ordered in an ascending order of the cost values.

In another implementation of the second aspect, an index value of the second one of the one or more merge indices is in an index range of 0 to K−1.

In another implementation of the second aspect, the multiple merge candidates that are arranged after a K-th merge candidate in the arrangement of the selected one of the multiple merge subgroups are excluded from the selecting.

In another implementation of the second aspect, the first one of the one or more merge indices is identical to or different from the second one of the one or more merge indices.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
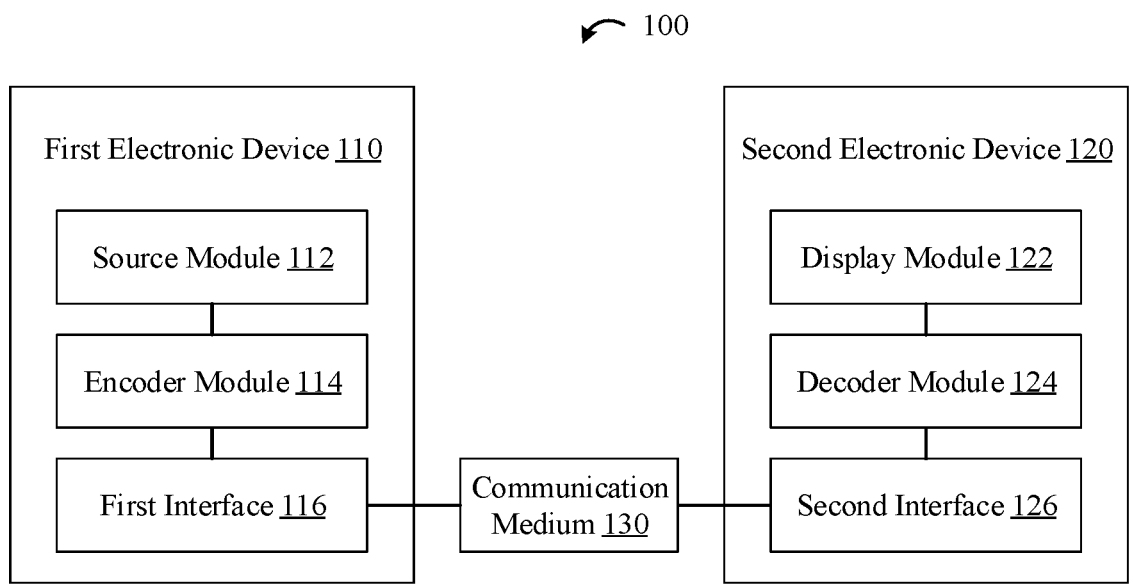
FIG. 1 is a block diagram illustrating a system configured to encode and decode video data, in accordance with one or more example implementations of this disclosure.

The following disclosure contains specific information pertaining p to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details such as functional entities, techniques, protocols, and standards are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having computer-executable instructions stored on a computer-readable medium, such as memory or other type of storage devices. For example, one or more microprocessors or general-purpose computers with communication processing capability may be programmed with executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions.

FIG. 1 is a block diagram illustrating a system 100 configured to encode and decode video data, in accordance with one or more example implementations of this disclosure. The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive the encoded video data via the communication medium 130 and to decode the encoded video data.

The first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having instructions for the software in a suitable, non-transitory computer-readable medium and execute the stored instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE) or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or a light-emitting polymer display (LPD) technology, with other display technologies used in some other implementations. The display module 122 may include a high-definition display or an ultra-high-definition display.

Figure 2:
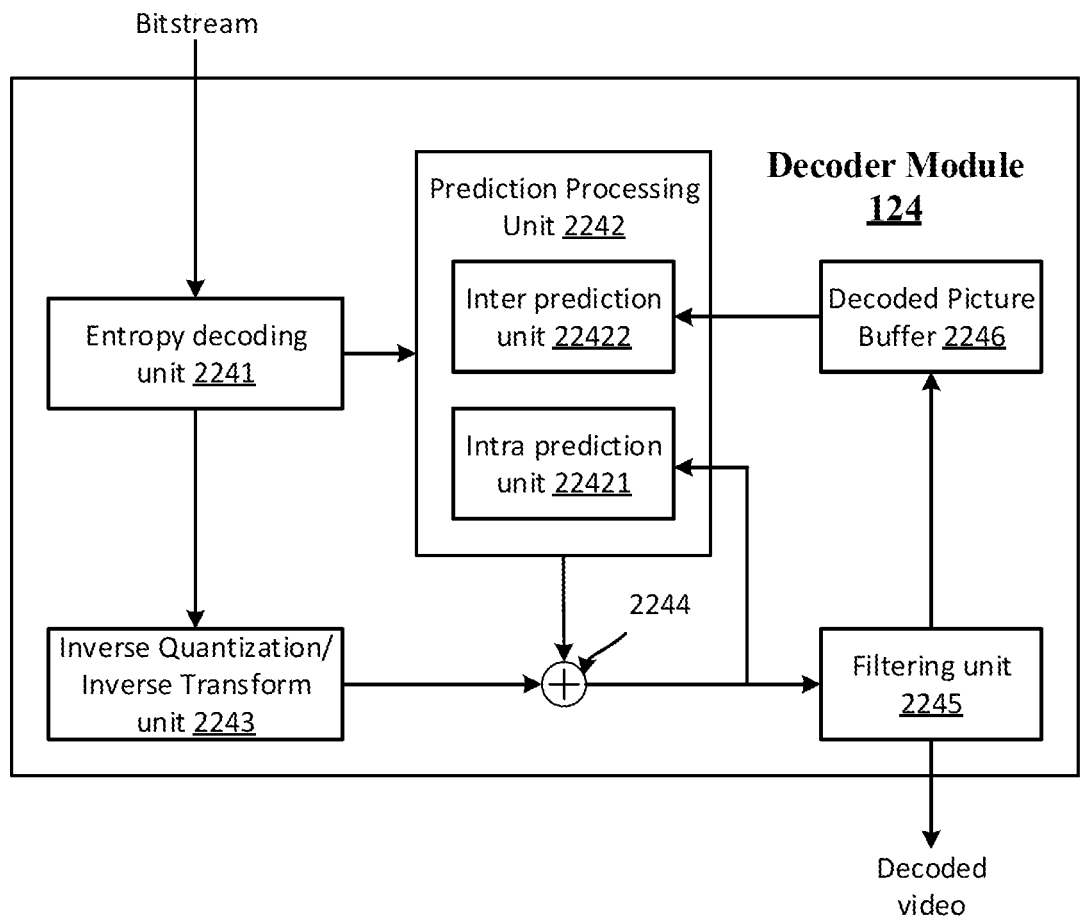
FIG. 2 is a block diagram illustrating the decoder module of the second electronic device illustrated in FIG. 1, in accordance with one or more example implementations of this disclosure.

FIG. 2 is a block diagram illustrating the decoder module 124 of the second electronic device 120 illustrated in FIG. 1, in accordance with one or more example implementations of this disclosure. The decoder module 124 includes an entropy decoder (e.g., entropy decoding unit 2241), a prediction processor (e.g., prediction processing unit 2242), an inverse quantization/inverse transform processor (e.g., inverse quantization/inverse transform unit 2243), a summer (e.g., summer 2244), a filter (e.g., filtering unit 2245), and a decoded picture buffer (e.g., decoded picture buffer 2246). The prediction processing unit 2242 further includes an intra prediction processor (e.g., intra prediction unit 22421) and an inter prediction processor (e.g., inter prediction unit 22422). The decoder module 124 receives a bitstream and decodes the bitstream to output decoded video.

The entropy decoding unit 2241 may receive the bitstream including multiple syntax elements from the second interface 126, as illustrated in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide video frame according to the partition information.

Each of the video frame may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or another equivalent coding unit.

During the decoding process, the prediction processing unit 2242 may receive predicted data including the intra mode or the motion vector for a current image block of a specific one of the video frame. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the chroma components are reconstructed by the prediction processing unit 2242.

The intra prediction unit 22421 may reconstruct multiple chroma components of the current block unit based on the multiple luma components of the current block unit when the luma components of the current block are reconstructed by the prediction processing unit 2242.

The inter prediction unit 22422 may perform inter-predictive coding of the current block unit relative to one or more blocks in one or more reference images based on syntax elements related to the motion vector in order to generate the predicted block. The motion vector may indicate a displacement of the current block unit within the current image block relative to a reference block unit within the reference image. The reference block unit is a block determined to closely match the current block unit. The inter prediction unit 22422 may receive the reference image stored in the decoded picture buffer 2246 and reconstruct the current block unit based on the received reference images. The reference images may be selected from a first reference image list L0 and a second reference image list L1, each constructed for the current block unit. When the result of the inter-predictive coding is a uni-prediction, the current block unit may be predicted based on one reference block unit selected from one of the first reference image list L0 and the second reference image list L1. When the result of the inter-predictive coding is a bi-prediction, the current block unit may be predicted based on two reference block units respectively selected from the first reference image list L0 and the second reference image list L1.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain. The inverse transformation may be inversely applied by the transformation process such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, integer transform, a sub-band transform, or a conceptually similar transform. The inverse transformation may convert the residual information from a transform domain, such as a frequency domain, back to the pixel domain. The degree of inverse quantization may be modified by adjusting a quantization parameter.

The summer 2244 adds the reconstructed residual block to the predicted block provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
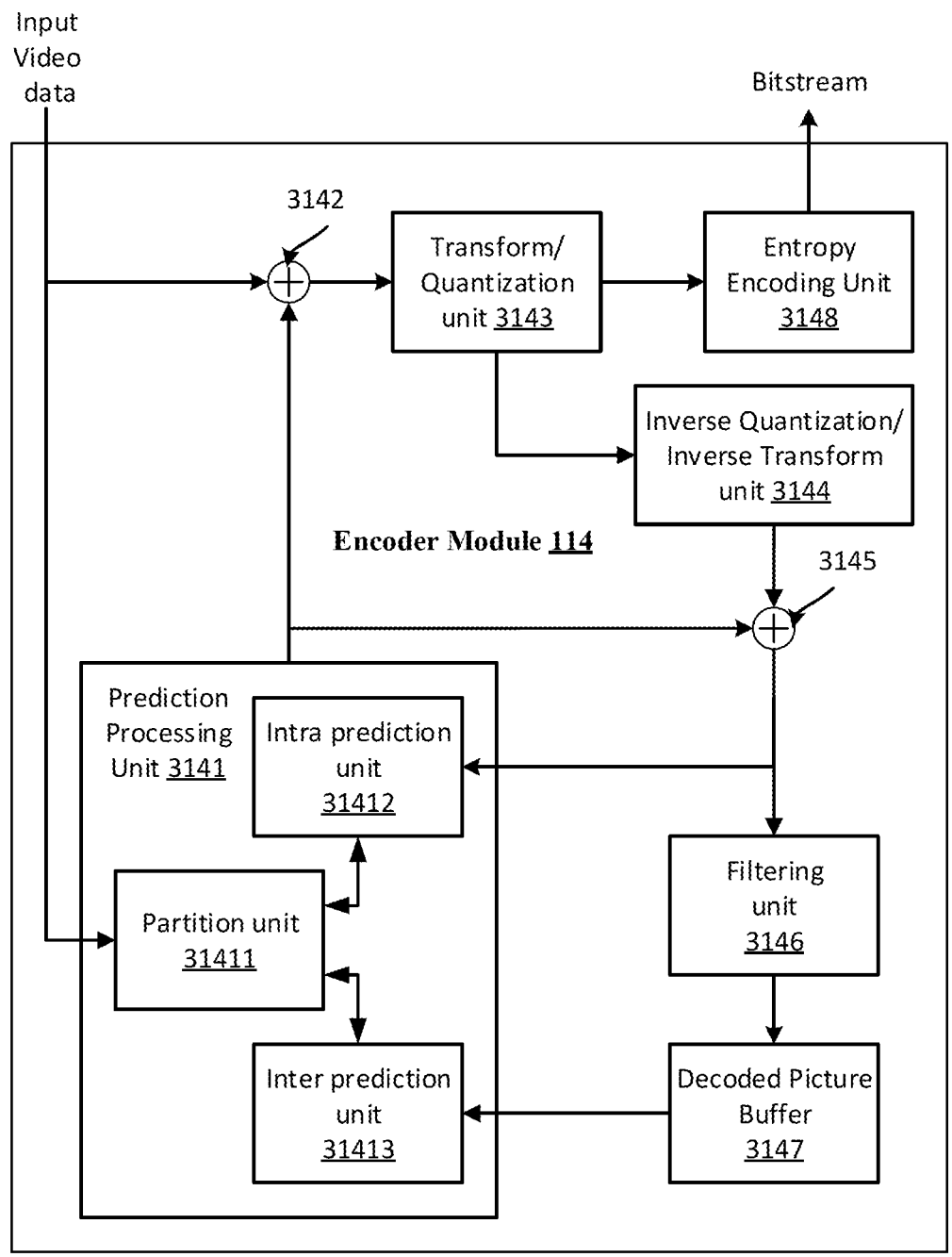
FIG. 3 is a block diagram illustrating the encoder module of the first electronic device illustrated in FIG. 1, in accordance with one or more example implementations of this disclosure.

FIG. 3 is a block diagram illustrating the encoder module 114 of the first electronic device 110 illustrated in FIG. 1, in accordance with one or more example implementations of this disclosure. The encoder module 114 may include a prediction processor (e.g., prediction processing unit 3141), at least a first summer (e.g., first summer 3142) and a second summer (e.g., second summer 3145), a transform/quantization processor (e.g., transform/quantization unit 3143), an inverse quantization/inverse transform processor (e.g., inverse quantization/inverse transform unit 3144), a filter (e.g., filtering unit 3146), a decoded picture buffer (e.g., decoded picture buffer 3147), and an entropy encoder (e.g., entropy encoding unit 3148). The prediction processing unit 3141 of the encoder module 114 may further include a partition processor (e.g., partition unit 31411), an intra prediction processor (e.g., intra prediction unit 31412), and an inter prediction processor (e.g., inter prediction unit 31413).

The encoder module 114 may receive the source video and encode the source video to output a bitstream. The encoder module 114 may receive source video including multiple video frames and then divide each of the video frames according to a coding structure. Each of the video frames may be divided into at least one image block.

The at least one image block may include a luminance block having multiple luminance samples and at least one chrominance block having multiple chrominance samples. The luminance block and the at least one chrominance block may be further divided to generate macroblocks, coding tree units (CTUs), coding blocks (CBs), sub-divisions thereof, and/or another equivalent coding unit.

The encoder module 114 may perform additional subdivisions of the source video. It should be noted that the disclosed implementations are generally applicable to video coding regardless of how the source video is partitioned prior to and/or during the encoding.

During the encoding process, the prediction processing unit 3141 may receive a current image block of a specific one of the video frame. The current image block may be the luminance block or one of the chrominance blocks in the specific image frame.

The partition unit 31411 may divide the current image block into multiple block units. The intra prediction unit 31412 may perform intra-predictive coding of a current block unit relative to one or more neighboring blocks in the same frame as the current block unit in order to provide spatial prediction. The inter prediction unit 31413 may perform inter-predictive coding of the current block unit relative to one or more blocks in one or more reference images to provide temporal prediction.

The prediction processing unit 3141 may select one of the coding results generated by the intra prediction unit 31412 and the inter prediction unit 31413 based on a mode selection method, such as a cost function. The mode selection method may be a rate-distortion optimization (RDO) process.

The prediction processing unit 3141 may determine the selected coding result and provide a predicted block corresponding to the selected coding result to the first summer 3142 for generating a residual block and to the second summer 3145 for reconstructing the encoded block unit. The prediction processing unit 3141 may further provide syntax elements, such as motion vectors, intra mode indicators, partition information, and other syntax information, to the entropy encoding unit 3148.

The intra prediction unit 31412 may intra-predict the current block unit. The intra prediction unit 31412 may determine an intra prediction mode directed toward a reconstructed sample neighboring the current block unit in order to encode the current block unit.

The intra prediction unit 31412 may encode the current block unit using various intra prediction modes. The intra prediction modes may include multiple non-angular modes and multiple angular modes. The non-angular modes may include a Planar mode and a DC mode. In addition, the number of the angular modes may be equal to 32 when the encoder module 114 encodes the block unit in high efficiency video coding (HEVC). The number of the angular modes may be equal to 65 when the encoder module 114 encodes the block unit in versatile video coding (VVC) or VVC test model (VTM). The intra prediction unit 31412 of the prediction processing unit 3141 may select an appropriate intra prediction mode from the selected modes. The intra prediction unit 31412 may encode the current block unit using a cross component prediction mode to predict one of the two chroma components of the current block unit based on the luma components of the current block unit. The intra prediction unit 31412 may predict a first one of the two chroma components of the current block unit based on the second of the two chroma components of the current block unit.

The inter prediction unit 31413 may inter-predict the current block unit as an alternative to the intra prediction performed by the intra prediction unit 31412. The inter prediction unit 31413 may perform motion estimation to estimate motion of the current block unit for generating a motion vector.

The motion vector may indicate a displacement of the current block unit within the current image block relative to a reference block unit within a reference image. The inter prediction unit 31413 may receive at least one reference image stored in the decoded picture buffer 3147 and estimate the motion based on the received reference images to generate the motion vector. The reference images may be selected from a first reference image list L0 and a second reference image list L1, each constructed for the current block unit. When the result of the inter-predictive coding is a uni-prediction, the current block unit may be predicted based on one reference block unit selected from one of the first reference image list L0 and the second reference image list L1. When the result of the inter-predictive coding is a bi-prediction, the current block unit may be predicted based on two reference block units respectively selected from the first reference image list L0 and the second reference image list L1.

The first summer 3142 may generate the residual block by subtracting the prediction block determined by the prediction processing unit 3141 from the original current block unit. The first summer 3142 may represent the component or components that perform this subtraction.

The transform/quantization unit 3143 may apply a transform to the residual block in order to generate a residual transform coefficient and then quantize the residual transform coefficients to further reduce bit rate. The transform may be one of a DCT, DST, AMT, MDNSST, HyGT, signal dependent transform, KLT, wavelet transform, integer transform, sub-band transform, or a conceptually similar transform.

The transform may convert the residual information from a pixel value domain to a transform domain, such as a frequency domain. The degree of quantization may be modified by adjusting a quantization parameter.

The transform/quantization unit 3143 may perform a scan of the matrix including the quantized transform coefficients. Alternatively, the entropy encoding unit 3148 may perform the scan.

The entropy encoding unit 3148 may receive multiple syntax elements from the prediction processing unit 3141 and the transform/quantization unit 3143, including a quantization parameter, transform data, motion vectors, intra modes, partition information, and other syntax information. The entropy encoding unit 3148 may encode the syntax elements into the bitstream.

The entropy encoding unit 3148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120 illustrated in FIG. 1) or archived for later transmission or retrieval.

The inverse quantization/inverse transform unit 3144 may apply inverse quantization and inverse transformation to reconstruct the residual block in the pixel domain for later use as a reference block. The second summer 3145 may add the reconstructed residual block to the prediction block provided from the prediction processing unit 3141 in order to produce a reconstructed block for storage in the decoded picture buffer 3147.

The filtering unit 3146 may include a deblocking filter, an SAO filter, a bilateral filter, and/or an ALF to remove blocking artifacts from the reconstructed block. Additional filters (in loop or post loop) may be used in addition to the deblocking filter, the SAO filter, the bilateral filter, and the ALF. Such filters are not illustrated for brevity and may filter the output of the second summer 3145.

The decoded picture buffer 3147 may be a reference picture memory that stores the reference block to be used by the encoder module 114 to encode video, such as in intra- or inter-coding modes. The decoded picture buffer 3147 may include a variety of memory devices, such as DRAM (e.g., including SDRAM), MRAM, RRAM, or other types of memory devices. The decoded picture buffer 3147 may be on-chip with other components of the encoder module 114 or off-chip relative to those components.

Figure 4:
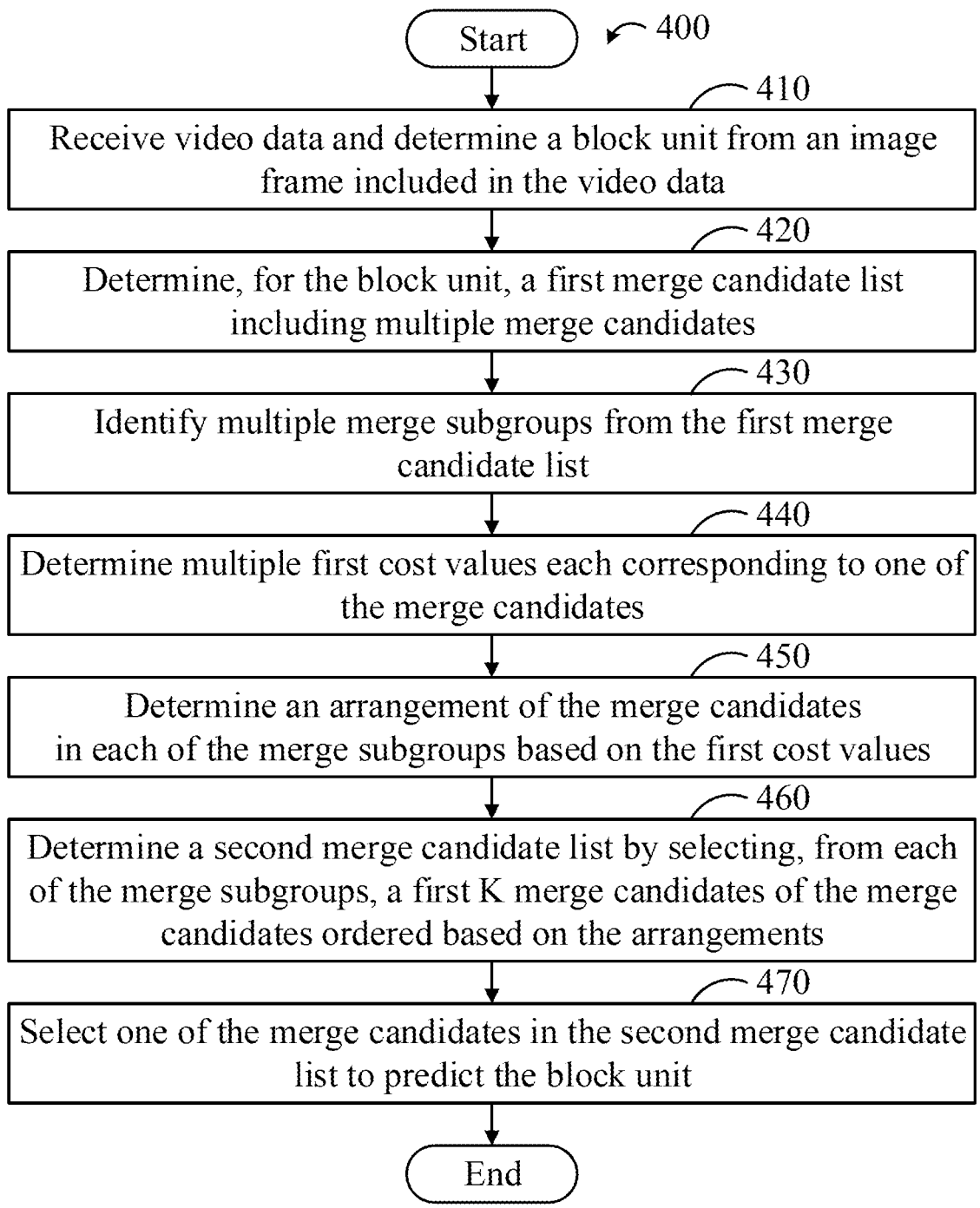
FIG. 4 is a flowchart illustrating a method/process for encoding video data by an electronic device, in accordance with one or more example implementations of this disclosure.

FIG. 4 is a flowchart illustrating a method/process 400 for encoding video data by an electronic device, in accordance with one or more example implementations of this disclosure. The method/process 400 is an example implementation, as there are a variety of implementation in which encoding of the video data is possible.

The method/process 400 may be performed by an electronic device using the configurations illustrated in FIG. 1 and FIG. 3, and various elements of these figures are referenced with the description of the method/process 400. Each block illustrated in FIG. 4 may represent one or more processes, methods, or subroutines performed by an electronic device.

The order in which the blocks appear in FIG. 4 is illustrative only, and is not intended to limit the scope of the present disclosure, thus may be different from what is illustrated. Additional blocks may be added or fewer blocks may be utilized without departing from the present disclosure.

At block 410, the encoder module 114 receives video data and determines a block unit from an image frame included in the video data.

With reference to FIGS. 1 and 3, the encoder module 114 of the first electronic device 110 may receive the video data from the source module 112. The video data received by the encoder module 114 may be a video. The encoder module 114 may determine one of multiple video frames in the video as the image frame and determine a block unit from the image frame in the video.

In some implementations, the prediction processing unit 3141 of the encoder module 114 may determine the block unit from the determined image frame via the partition unit 31411, and the encoder module 114 may provide multiple partition indications to a bitstream based on a partitioning result of the partition unit 31411.

At block 420, the encoder module 114 determines, for the block unit, a first merge candidate list including multiple merge candidates.

With reference to FIG. 1 and FIG. 3, the encoder module 114 may apply a merge mode on the block unit to determine the merge candidates of the block unit included in the first merge candidate list of the block unit. The first merge candidate list may be constructed based on several kinds of merge candidates, such as multiple spatial motion vector predictions (MVPs) determined from multiple spatial neighboring blocks, multiple temporal MVPs from multiple collocated blocks, multiple spatial MVPs determined from multiple non-adjacent blocks, multiple history-based MVPs determined from a first-in-first-out (FIFO) table, multiple pair-wise average MVPs, and multiple zero motion vectors (zero MVs) having no motion.

In some implementations, the MVs of the spatial neighboring blocks that neighbor the block unit may be reused for the block unit since the motion of the block unit may be similar to that of one of the spatial neighboring blocks. Thus, the spatial MVPs of the spatial neighboring blocks may be selected as the merge candidates of the block unit. In some implementations, the spatial neighboring blocks may include an encoded block located at a top-left side of a top-left corner of the block unit, an encoded block located at a top-right side of a top-right corner of the block unit, an encoded block located above the top-right corner of the block unit, an encoded block located at a bottom-left side of a bottom-left corner of the block unit, and an encoded block located at a left side of the bottom-left corner of the block unit.

In some implementations, the MVs of the collocated blocks in multiple reference images different from the image frame may be reused for the block unit since the motion of the block unit may be similar to that of one of the collocated blocks. Thus, the temporal MVPs of the collocated blocks may be selected as the merge candidates of the block unit.

In some implementations, the MVs of the non-adjacent blocks in the image frame may be reused for the block unit since the motion of the block unit may be similar to that of one of the non-adjacent blocks. Thus, the spatial MVPs of the non-adjacent blocks may be selected as the merge candidates of the block unit. In some implementations, the non-adjacent blocks may be selected based on a block width WB and a block height HB of the block unit.

In some implementations, with respect to the history-based MVPs, the motion information of a previously coded block may be stored in a FIFO table and may be used as merge candidate of the block unit. When inserting a new MV into the FIFO table, a constrained FIFO rule may be utilized to update the FIFO table. In some implementations, the pair-wise average candidates may be generated by averaging pairs of candidates included in the first merge candidate list. In some implementations, the pair-wise average candidates may be generated by using first two candidates of the merge candidates in the first merge candidate list. In some implementations, when the first merge candidate list is not full, the zero MV candidates may be added at the end until a maximum number of the merge candidates is met. In some implementations, the maximum number of the merge candidates in the first merge candidate list may be predefined (or preconfigured).

In some implementations, the merge mode may further include a merge mode with motion vector difference (MMVD) mode. In the MMVD mode, the encoder module 114 may also determine the merge candidates of the block unit included in the first merge candidate list of the block unit. Each of the merge candidates of the block unit may be determined, respectively, based on one of multiple base motion candidates, one of multiple motion differences, and/or one of multiple prediction directions. For example, one of the motion differences and one of the prediction directions may be used to determine one of multiple difference motion vectors, and one of the difference motion vectors and one of the base motion candidates may be combined to determine one of the merge candidates. In some implementations, the one of the difference motion vectors and a base motion vector of the one of the base motion candidates may be combined to generate a merge motion vector.

At block 430, the encoder module 114 identifies multiple merge subgroups from the first merge candidate list.

With reference to FIG. 1 and FIG. 3, the encoder module 114 may determine the merge subgroups and add the merge candidates in the first merge candidate list to the merge subgroups. A number of the merge candidates in each of the merge subgroups may be equal to or less than a value of a number N. The number N may be a predefined number which is a positive integer.

In some implementations, the first merge candidate list may be divided to generate the merge subgroups. In some implementations, the numbers of the merge candidates in the merge subgroups may be determined based on the value of the number N. The number of the merge candidates in at least one of the merge subgroups may be equal to the value of the number N. In some implementations, the number of the merge candidates in the merge subgroups may not be equal to each other when the number Nt1 of the merge candidates in the first merge candidate list is not divisible by the number N. For example, the number Nt1 of the merge candidates in the first merge candidate list may be equal to 15. Thus, the number of the merge candidates in the merge subgroups may be equal to 3 or 4 when the number N is equal to 4. In some implementations, the number Nt1 of the merge candidates in the first merge candidate list may be divisible by the number N. Thus, the number of the merge subgroups may be equal to a quotient being a positive integer. For example, the number Nt1 of the merge candidates in the first merge candidate list may be equal to 15 and the number N may be equal to 5. Thus, the number of the merge subgroups may be equal to 3.

In some implementations, at least one of the zero MV candidates may not be added into the merge subgroups when the at least one of the zero MV candidates is included in the first merge candidate list. In some implementations, the number of the merge candidates in the merge subgroups may not be equal to each other when the number of the other merge candidates in the first merge candidate list is not divisible by the number N.

In some implementations, the numbers of the merge candidates in the merge subgroups may be different from each other and equal to or less than the number N. The number of the merge subgroups may be equal to a number G. Thus, the numbers of the merge candidates in the merge subgroups may be equal to M1, M2, . . . , and MG. In addition, a k-th merge subgroup may include Mk of the merge candidates including a J-th one of the merge candidates to an L-th one of the merge candidates. In some implementations, the numbers k, J, L, G, M1, M2, . . . , Mk, . . . , and MG may be positive integers. The number J may be equal to $1+\Sigma_{i=1}^{i=k-1}$ Mi and the number L may be equal to $\Sigma_{i=1}^{i=k-1}$ Mi. In some implementations, the number G may be equal to two. Thus, the first merge subgroup may include M1 merge candidates having multiple candidate indices within a first index range of 0 to M1−1, and the second merge subgroup may include M2 merge candidates having the candidate indices within a second index range of M1 to M1+M2−1.

In some implementations, the number Nt1 of the merge candidates in the first merge candidate list may be equal to 15, and the numbers of the merge candidates in the merge subgroups may be predefined to be equal to 4, 5, and 6. Therefore, the first merge candidate list may be divided to generate 3 subgroups each having different numbers of the merge candidates. The first merge subgroup may include 4 merge candidates having the candidate indices from 0 to 3, the second subgroup may include 5 merge candidates having the candidate indices from 4 to 8, and the third subgroup may include 6 merge candidates having the candidate indices from 9 to 14.

In some implementations, the numbers of the merge candidates in the merge subgroups may be determined based on a size parameter of the block unit. The numbers of the merge candidates in the merge subgroups may be increased to be greater than a predefined number when the size parameter is greater than or equal to a size threshold. In some implementations, the size threshold may be a positive integer. In some implementations, the size parameter of the block unit may be determined based on at least one of the block width WB or the block height HB of the block unit. For example, the size parameter of the block unit may be equal to one of the block width WB and the block height HB of the block unit. The size parameter of the block unit may be equal to a product of the block width WB and the block height HB of the block unit. The size parameter of the block unit may be equal to a quotient generated by dividing the block width WB of the block unit by the block height HB of the block unit or generated by dividing the block height HB of the block unit by the block width WB of the block unit.

In some implementations, the encoder module 114 may identify multiple merge subgroups from the first merge candidate list based on the base motion candidates. The merge candidates may be determined based on the base motion candidates, the motion differences, and the prediction directions. In addition, the motion differences and the prediction directions may be used to determine the difference motion vectors, so the merge candidates may be determined based on the base motion candidates and the difference motion vectors. Therefore, the merge subgroups may be directly determined based on the base motion candidates. In some implementations, the number of the base motion candidates may be equal to the number of the merge subgroups. Thus, the numbers of the merge candidates in the merge subgroups may be determined based on the number of the difference motion vectors.

In some implementations, when one of the base motion candidates is a uni-prediction candidate, the number of the merge candidates in the merge subgroup corresponding to the one of the base motion candidates may be equal to the number of the difference motion vectors. For example, the number of the motion differences may be equal to 6 and the number of the prediction directions may be equal to 16. Thus, the number of the merge candidates in the merge subgroup corresponding to a uni-prediction candidate may be equal to 96.

In some implementations, the number of the merge candidates determined based on one of the base motion candidates and one of the difference motion vectors may be equal to three when the one of the base motion candidates is a bi-prediction candidate. One of the three merge candidates may be a uni-prediction candidate corresponding to a first reference image list L0, another one of the three merge candidates may be another uni-prediction candidate corresponding to a second reference image list L1, and the last of the three merge candidates may be a bi-prediction candidate corresponding to the first reference image list L0 and the second reference image list L1. Thus, when one of the base motion candidates is a bi-prediction candidate, the number of the merge candidates in the merge subgroup corresponding to the one of the base motion candidates may be equal to a product of the number of the difference motion vectors and 3. For example, the number of the motion differences may be equal to 6 and the number of the prediction directions may be equal to 16. Thus, the number of the merge candidates in the merge subgroup corresponding to a bi-prediction candidate may be equal to 288. In some implementations, since each of the base motion candidates may be one of the uni-prediction candidate and the bi-prediction candidate, a maximum of the numbers of the merge candidates in the merge subgroups determined based on the number of the difference motion vectors may be equal to the number Ns.

Referring back to FIG. 4, at block 440, the encoder module 114 determines multiple first cost values each corresponding to one of the merge candidates.

With reference to FIG. 1 and FIG. 3, the encoder module 114 may calculate the first cost value for each of the merge candidates based on a template matching. The encoder module 114 may determine a reference block for each of the merge candidates and further determine a reference template region for each of the reference blocks. In addition, the encoder module 114 may determine a block template region neighboring the block unit. The encoder module 114 may compare the reference template regions with the block template region for determining the first cost values of the merge candidates.

In some implementations, the block template region may include a first neighboring region located above the block unit and a second neighboring region located at the left side of the block unit. The first neighboring region may have a first region width Wr1 and a first region height Hr1, and the second neighboring region may have a second region width Wr2 and a second region height Hr2. In some implementations, the first region width Wr1 of the first neighboring region may be determined based on the block width WB of the block unit, the second region height Hr2 of the second neighboring region may be determined based on the block height HB of the block unit, and the first region height Hr1 of the first neighboring region and the second region width Wr2 of the second neighboring region may be predefined at the encoder module 114. In some implementations, the first region width Wr1 of the first neighboring region may be equal to the block width WB of the block unit and the second region height Hr2 of the second neighboring region may be equal to the block height HB of the block unit. In some implementations, the first region width Wr1 of the first neighboring region may be equal to a first width parameter Wp1 generated by multiplying the block width WB of the block unit by a first width factor Fw1, and the second region height Hr2 of the second neighboring region may be equal to a first height parameter Hp1 generated by multiplying the block height HB of the block unit by a first height factor Fh1. In some implementations, the lengths Wr1, Hr1, Wr2, Hr2, Wp1, Hp1, WB, and HB may be positive integers, and the first width factor Fw1 and the first height factor Fh1 may have positive values.

In some implementations, each of the reference template regions may neighbor a corresponding one of the reference blocks, each having a reference width WR and a reference height HR. Each of the reference template regions may include a first reference region located above a corresponding one of the reference blocks and a second reference region located at the left side of the corresponding one of the reference blocks. The first reference region may have a third region width Wr3 and a third region height Hr3, and the second reference region may have a fourth region width Wr4 and a fourth region height Hr4. In some implementations, the reference width WR of the reference block and the third region width Wr3 of the first reference region may be determined based on the block width WB of the block unit, the reference height HR of the reference block and the fourth region height Hr4 of the second reference region may be determined based on the block height HB of the block unit, and the third region height Hr3 of the first reference region and the fourth region width Wr4 of the second reference region may be predefined at the encoder module 114. In some implementations, the reference width WR of the reference block and the third region width Wr3 of the first reference region may be equal to the block width WB of the block unit and the reference height HR of the reference block and the fourth region height Hr4 of the second reference region may be equal to the block height HB of the block unit.

In some implementations, the third region width Wr3 of the first reference region may be equal to a second width parameter Wp2 generated by multiplying the reference width WR of the reference block by a second width factor Fw2 and the fourth region height Hr4 of the second reference region may be equal to a second height parameter Hp2 generated by multiplying the reference height HR of the reference block by a second height factor Fh2. In some implementations, the lengths Wr3, Hr3, Wr4, Hr4, Wp2, Hp2, WR, and HR may be positive integers, and the second width factor Fw2 and the second height factor Fh2 may have positive values.

In some implementations, in order to compare each of the reference template regions with the block template region, each of the third region widths Wr3 may be equal to the first region width Wr1, each of the third region heights Hr3 may be equal to the first region height Hr1, each of the fourth region widths Wr4 may be equal to the second region width Wr2, and each of the fourth region heights Hr4 may be equal to the second region height Hr2. The block template region may include multiple first reconstructed samples predicted and reconstructed prior to predicting the block unit. Each of the reference template regions may include multiple second reconstructed samples predicted and reconstructed prior to predicting the block unit. The number of the first reconstructed samples may be equal to the number of the second reconstructed samples in each of the reference template regions.

In some implementations, the encoder module 114 may compare each of the reference template regions with the block template region by using a first cost function to determine the first cost values of the merge candidates. The encoder module 114 may determine the first cost values by comparing the second reconstructed samples in each of the reference template regions with the first reconstructed samples based on the first cost function. The first cost function may include, but not be limited to, Sum of Absolute Difference (SAD), Sum of Absolute Transformed Difference (SATD), Mean Absolute Difference (MAD), Mean Squared Difference (MSD), and Structural SIMilarity (SSIM). It should be noted that any cost function may be used without departing from this disclosure.

In some implementations, the first cost value for each of the merge candidates is a template matching cost value determined based on the first reconstructed samples in the neighboring regions of the block template region neighboring the block unit and the second reconstructed samples in the reference template region neighboring a corresponding one of the reference blocks determined based on a corresponding one of the merge candidates.

Referring back to FIG. 4, at block 450, the encoder module 114 determines an arrangement of the merge candidates in each of the merge subgroups based on the first cost values.

With reference to FIG. 1 and FIG. 3, the encoder module 114 may reorder the merge candidates in each of the merge subgroups based on the first cost values of the merge candidates in a corresponding one of the merge subgroups. In some implementations, the merge candidates in each of the merge subgroups may be reordered in an ascending order or a descending order of the first cost values of the merge candidates in a corresponding one of the merge subgroups.

In some implementations, before the arrangement is determined based on the first cost values, the merge candidates in each of the merge subgroups may be ordered based on arbitrary rules. For example, the merge candidates in each of the merge subgroups may be ordered based on an order in which the merge candidates are added into the first merge candidate list. In some implementations, the last one of the merge subgroups may remain unchanged when the number of the merge subgroups is greater than one.

In some implementations, the merge candidates in each of the merge subgroups may be reordered in the ascending order of the first cost values of the merge candidates in a corresponding one of the merge subgroups. Thus, when the first cost value of a specific one of the merge candidates included in a specific one of the merge subgroups is less than the first cost values of the other merge candidates in the specific merge subgroup, the specific merge candidate may be moved forward to be a first merge candidate in the specific merge subgroup based on the arrangement. In order words, the specific merge candidate may be moved to be a first merge candidate in the specific merge subgroup when the first cost value of the specific merge candidate in the specific merge subgroup is the minimum of the first cost values of the specific merge group. In addition, the specific merge candidate may be moved to be a last one of the merge candidates in the specific merge subgroup when the first cost value of the specific merge candidate in the specific merge subgroup is the maximum of the first cost values of the specific merge group. For example, the specific merge group may include four merge candidates MC1, MC2, MC3, and MC4 having four of the first cost values (CV1, CV2, CV3, and CV4). When the relation between four of the first cost values is CV4>CV2>CV1>CV3, the arrangement of the specific merge candidates may be changed from an original order of the four merge candidates MC1, MC2, MC3, and MC4 to the new order of the four merge candidates MC3, MC1, MC2, and MC4.

In some implementations, the arrangement may be further determined based on a diversity criterion. The encoder module 114 may determine a difference value between two of the first cost values selected from two neighboring ones of the merge candidates. When the difference value is less than or equal to a diversity threshold, the last one of the two neighboring ones of the merge candidates may be moved backward. For example, the relation between the four of the first cost values may be CV4>CV2>CV1>CV3, and the difference between two of the first cost values CV1 and CV3 may be less than the diversity threshold. Thus, the merge candidates MC1 may be moved backward in the specific merge subgroup. Therefore, the arrangement of the specific merge candidates may be changed from the original order of the four merge candidates MC1, MC2, MC3, and MC4 to the new order of the four merge candidates MC3, MC2, MC1, and MC4.

In some implementations, the arrangement may be determined by the encoder module 114, but it may be unnecessary to adjust the order of the merge candidates in each of the merge subgroups. In other words, the encoder module 114 may determine the first cost values and determine the arrangement of the merge candidates in each of the merge subgroups in the ascending order or the descending order of the first cost values of the merge candidates in a corresponding one of the merge subgroups. Then, the encoder module 114 may directly select the merge candidates based on the arrangements without reordering the merge subgroups.

In some implementations, the encoder module 114 may identify the merge subgroups from the first merge candidate list based on the base motion candidates. Since the motion differences and the prediction directions may be used to determine the difference motion vectors, the merge candidates may be determined based on the base motion candidates and the difference motion vectors. Therefore, the merge subgroups may be directly determined based on the base motion candidates. In other words, the arrangement may be determined for the difference motion vectors. Therefore, the encoder module 114 may determine the arrangement of the difference motion vectors for each of the base motion candidates.

At block 460, the encoder module 114 determines a second merge candidate list by selecting, from each of the merge subgroups, a first K merge candidates of the merge candidates ordered based on the arrangements.

With reference to FIG. 1 and FIG. 3, the encoder module 114 may determine the first K of the merge candidates from each of the merge subgroups and add the first K of the merge candidates to the second merge candidates list. A value of the number K may be a positive integer that is less than N, but greater than or equal to one. Thus, the number Nt2 of the merge candidates in the second merge candidate list may be equal to K×G and less than the number Nt1 of the merge candidates in the first merge candidate list.

In some implementations, the merge candidates selected from the same merge subgroup into the second merge candidate list may be arranged based on the arrangement determined based on the first cost values of the merge candidates in the same merge subgroup. In other words, in the second merge candidate list, the merge candidates selected from a specific one of the merge subgroups may be arranged based on the arrangement of the specific merge subgroup. Thus, in the second merge candidate list, the merge candidates selected from the specific merge subgroup may be arranged in the ascending order or the descending order of the first cost values of the merge candidates in the specific merge subgroup.

In some implementations, the merge candidates in the second merge candidate list may be arranged based on a group order of the merge subgroups. In other words, in the second merge candidate list, the merge candidates in a first one of the merge subgroups may be arranged before the merge candidates in the other merge subgroups, and the merge candidates in a second one of the merge subgroups may be arranged before the merge candidates in a third one of the merge subgroups and in the back of the merge candidates in the first one of the merge subgroups.

For example, the first merge subgroup may include four merge candidates MC1, MC2, MC3, and MC4, and the first merge subgroup may be reordered to have the arrangement MC3, MC1, MC2, and MC4 based on a relationship order (e.g., CV4>CV2>CV1>CV3). In addition, the second merge subgroup may include four merge candidates MC5, MC6, MC7, and MC8, and the second merge subgroup may be reordered to have another arrangement MC8, MC5, MC6, and MC7 based on a relationship order (e.g., CV7>CV6>CV5>CV8). When the number K is equal to two, the merge candidates MC3 and MC1 in the first merge subgroup and the merge candidates MC8 and MC5 in the second merge subgroup may be selected to be added into the second merge candidate list. In addition, in the second merge candidate list, the merge candidates MC3 and MC1 in the first merge subgroup and the merge candidates MC8 and MC5 in the second merge subgroup may be arranged based on the order of MC3, MC1, MC8, and MC5.

In some implementations, the merge candidates in the second merge candidate list may be the first K of the merge candidates arranged based on the arrangement in the first merge candidate list when the number of the merge subgroups is equal to one. In some other implementations, the merge candidates in the second merge candidate list may be K of the merge candidates having the first K minimum values of the first cost values of the merge candidates when the number of the merge subgroups is equal to one.

In some implementations, each of the merge candidates in the second merge candidate list may include a merge candidate index. In some implementations, the number of the merge candidates in the second merge candidate list may be equal to Nt2, and the merge candidate index for the second merge candidate list may be within an index range of 0 to Nt2−1. In some implementations, the number Nt2 may be a positive integer. Since the number Nt2 may be equal to K×G, the merge candidate index for the second merge candidate list may be within the index range of 0 to K×G−1.

Referring back to FIG. 4, at block 470, the encoder module 114 selects one of the merge candidates in the second merge candidate list to predict the block unit.

With reference to FIG. 1 and FIG. 3, the encoder module 114 may determine a second cost value for each of the merge candidates in the second merge candidate list, and determine the selected one of the merge candidates based on the second cost values. The second cost values of the merge candidates in the second merge candidate list may be different from the first cost values of the merge candidates in the second merge candidate list. In addition, the encoder module 114 may further encode one or more merge indices into a bitstream based on the selected one of the merge candidates.

In some implementations, the encoder module 114 may determine the second cost value by using a second cost function for each of the merge candidates in the second merge candidate list based on the block unit and multiple third reconstructed samples may be determined based on a corresponding one of the merge candidates. The third reconstructed samples indicated by the corresponding one of the merge candidates may be predicted, and reconstructed, prior to predicting the block unit. The second cost function may be different from the first cost function. In some implementations, the second cost function may be a rate-distortion optimization (RDO) process. In some implementations, the encoder module 114 may determine the selected one of the merge candidates as a prediction mode of the block unit for generating a coding result. Thus, the encoder module 114 may predict the block unit based on the selected one of the merge candidates to generate multiple predicted samples for the block unit.

In some implementations, the encoder module 114 may compare multiple block components of the block unit with the predicted samples of the block unit to generate multiple residual components of the block unit. The encoder module 114 may further encode the residual components of the block unit into the bitstream and signal the one or more merge indices for indicating the selected one of the merge candidates in the second merge candidate list into the bitstream. Furthermore, in order to further predict multiple following blocks, the encoder module 114 may further reconstruct the block unit based on the residual components and the selected one of the merge candidates in the second merge candidate list to generate multiple fourth reconstructed samples of the block unit. The fourth reconstructed samples may be used for intra-predictive coding to predict the following blocks in the image frame. In addition, the fourth reconstructed samples may further be filtered by the encoder module 114 and stored in the decoded picture buffer 3147 for the inter-predictive coding to predict the following blocks in multiple following images.

In some implementations, the one or more merge indices may include only one merge prediction index corresponding to one of the merge candidate indices for indicating one of the merge candidates in the second merge candidate list. The indicated one of the merge candidates in the second merge candidate list indicated by the merge prediction index may be identical to the selected one of the merge candidates in the second merge candidate list. When each of the merge subgroups only selects K of the merge candidates into the second merge candidate lists, the merge prediction index may be used to determine which one of the merge subgroups includes the selected one of the merge candidates. For example, when K is equal to three and the merge prediction index is equal to seven, the selected one of the merge candidates may be included in a third one of the merge subgroups since seven is greater than a product of 3 and 2. Thus, when the decoder module 124 receive the merge prediction index, the decoder module 124 may select one of the merge subgroups including the selected one of the merge candidates that determines the arrangement of the merge candidates in the selected merge subgroup for determining the selected one of the merge candidates based on the merge prediction index. For example, the selected one of the merge candidates may be the second one of the merge candidates in the third merge subgroup since the merge candidate indices of the merge candidates in the first and the second merge subgroups are within a range of 0 to 5.

In some implementations, the one or more merge indices may include a first one of the merge indices indicating which one of the merge subgroups includes the selected one of the merge candidates and a second one of the merge indices indicating which one of the merge candidates in the indicated merge subgroup is the selected one of the merge candidates. The first merge index may be a merge subgroup index for determining the indicated one of the merge subgroups, and the second merge index may be a subgroup candidate index for determining the indicated one of the merge candidates in the indicated one of the merge subgroups. In addition, an index value of the subgroup candidate index may be within an index range of 0 to K−1. In some implementations, when the one or more merge indices include more than one index, it may be unnecessary for the encoder module 114 to provide the merge candidate indices to the merge candidates in the second merge candidate list.

In some implementations, in the MMVD mode, the merge subgroup index may be a base motion index for selecting one of the base motion candidates and the subgroup candidate index may be regarded as a difference motion index for selecting one of the difference motion vectors or selecting one of multiple motion difference indices and one of multiple prediction direction indices.

Figure 5:
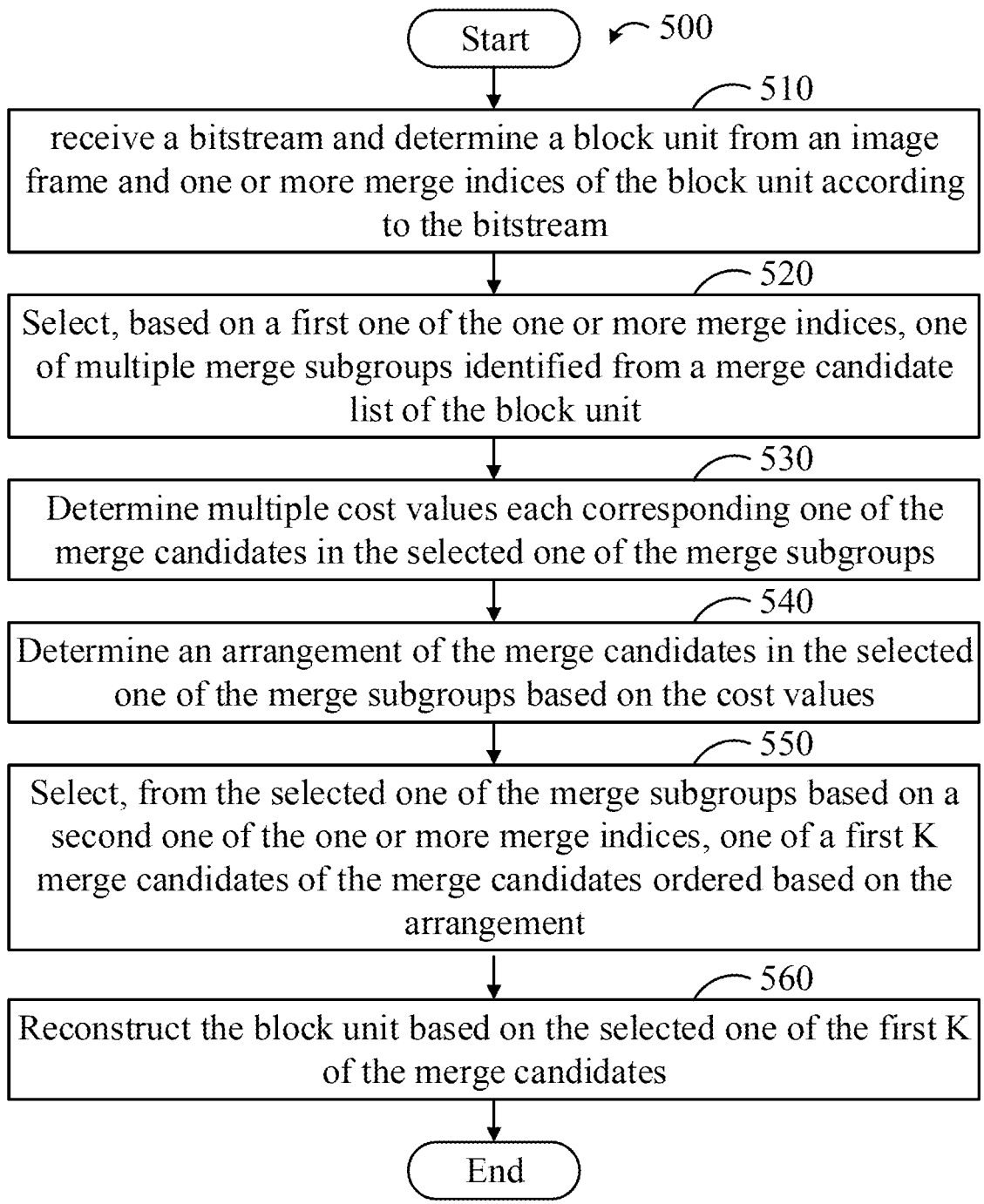
FIG. 5 is a flowchart illustrating a method/process for decoding video data by an electronic device, in accordance with one or more example implementations of this disclosure.

FIG. 5 is a flowchart illustrating a method/process 500 for decoding video data by an electronic device, in accordance with one or more example implementations of this disclosure. The method/process 500 is an example implementation, as there are a variety of implementation in which decoding of the video data is possible.

The method/process 500 may be performed by an electronic device using the configurations illustrated in FIG. 1 and FIG. 2, and various elements of these figures are referenced with the description of the method/process 500. Each block illustrated in FIG. 5 may represent one or more processes, methods, or subroutines performed by an electronic device.

In some implementations, the video data decoding by the method/process 500 may be a bitstream generating by encoding a video by the method/process 400. Thus, the method/process 500 for decoding the bitstream may be a decoding method corresponding to an encoding method performed by the method/process 400 for encoding the video.

The order in which the blocks appear in FIG. 5 is illustrative only, and is not intended to limit the scope of the present disclosure, thus may be different from what is illustrated. Additional blocks may be added or fewer blocks may be utilized without departing from the present disclosure.

At block 510, the decoder module 124 receives a bitstream and determines a block unit from an image frame, and one or more merge indices of the block unit according to the bitstream. The bitstream may be video data generated by encoding a video by the encoder module 114.

With reference to FIG. 1 and FIG. 2, the second electronic device 120 may receive the bitstream from an encoder, such as the first electronic device 110, or from other video providers via the second interface 126. The second interface 126 may provide the bitstream to the decoder module 124.

In some implementations, the entropy decoding unit 2241 may decode the bitstream to determine multiple prediction indications and multiple partitioning indications for multiple video frames. Then, the decoder module 124 may further reconstruct the video frames based on the prediction indications and the partitioning indications. The prediction indications and the partitioning indications may include multiple flags and multiple indices.

In some implementations, the decoder module 124 may determine one of the video frames as the image frame based on the bitstream and may divide the image frame to determine the block unit according to the partition indications in the bitstream. For example, the decoder module 124 may divide the image frame to generate multiple CTUs, and further divide one of the CTUs to determine the block unit according to the partition indications based on any video coding standard.

In some implementations, the indices of the prediction indications in the bitstream may include one or more merge indices of the block unit for selecting one of multiple merge candidates as a prediction mode when the block unit is predicted in a merge mode by the encoder module 114. In addition, the residual components of the block unit may be further encoded in the bitstream. Thus, the decoder module 124 may decode the bitstream to determine a predict mode and the residual components of the block unit for reconstructing the block unit.

At block 520, the decoder module 124 selects, based on a first one of the one or more merge indices, one of multiple merge subgroups identified from a merge candidate list of the block unit.

With reference to FIG. 1 and FIG. 2, the decoder module 124 may determine the merge subgroups generated from the merge candidate list. The merge candidate list may include multiple merge candidates.

In some implementations, the merge candidate list in the method/process 500 may correspond to the first merge candidate list in the method/process 400. Each of the merge subgroups may include a portion of the merge candidates. A number of the merge candidates in each of the merge subgroups may be equal to or less than a first value of a number N, N being a positive integer.

In some implementations, the merge candidate list may be divided to generate the merge subgroups in the encoder module 114 and the decoder module 124. The numbers of the merge candidates in the merge subgroups may be determined based on the value of the number N. The number of the merge candidates in at least one of the merge subgroups may be equal to the value of the number N. In some implementations, the number of the merge candidates in the merge subgroups may not be equal to each other when the number Nt1 of the merge candidates in the merge candidate list is not divisible by the number N. In some implementations, the number Nt1 of the merge candidates in the merge candidate list may be divisible by the number N. Thus, the number of the merge subgroups may be equal to a quotient being a positive integer.

In some implementations, the numbers of the merge candidates in the merge subgroups may be different from each other and equal to or less than the number N. The number of the merge subgroups may be equal to a number G. Thus, the numbers of the merge candidates in the merge subgroups may be equal to M1, M2, . . . , and MG. For example, the number Nt1 of the merge candidates in the merge candidate list may be equal to 15, and the numbers of the merge candidates in the merge subgroups may be predefined to be equal to 4, 5, and 6. Therefore, the merge candidate list may be divided to generate 3 subgroups each having different numbers of the merge candidates. The first merge subgroup may include 4 merge candidates having the candidate indices from 0 to 3, the second subgroup may include 5 merge candidates having the candidate indices from 4 to 8, and the third subgroup may include 6 merge candidates having the candidate indices from 9 to 14.

In some implementations, the numbers of the merge candidates in the merge subgroups may be determined based on a size parameter of the block unit. The numbers of the merge candidates in the merge subgroups may be increased to be greater than a predefined number when the size parameter is greater than or equal to a size threshold. In some implementations, the size threshold may be a positive integer. In some implementations, the size parameter of the block unit may be determined based on at least one of the block width WB or the block height HB of the block unit.

In some implementations, in the merge mode, the merge candidates in the merge candidate list may be constructed based on several kinds of merge candidates, such as multiple spatial motion vector predictions (MVPs) determined from multiple spatial neighboring blocks, multiple temporal MVPs from multiple collocated blocks, multiple spatial MVPs determined from multiple non-adjacent blocks, multiple history-based MVPs determined from a first-in-first-out (FIFO) table, multiple pair-wise average MVPs, and multiple zero motion vectors (zero MVs) having no motion. In some implementations, at least one of the zero MV candidates may not be added into the merge subgroups when the at least one of the zero MV candidates is included in the first merge candidate list. Since a first construction method for the first merge candidate list in the method/process 400 is identical to a second construction method for the merge candidate list in the method/process 500, the merge candidates in the first merge candidate list constructed for the block unit by the method/process 400 may be identical to the merge candidates in the merge candidate list constructed for the block unit by the method/process 500. Furthermore, a first identification method for identifying the merge subgroups from the first merge candidate list in the method/process 400 is identical to a second identification method for identifying the merge subgroups from the merge candidate list in the method/process 500, the merge subgroups identified for the block unit by the method/process 400 may be identical to the merge subgroups identified for the block unit by the method/process 500.

In some implementations, in a merge mode with motion vector difference (MMVD) mode, the decoder module 124 may also determine the merge candidates of the block unit included in the merge candidate list of the block unit. Each of the merge candidates of the block unit may be determined respectively based on one of multiple base motion candidates, one of multiple motion differences, and/or one of multiple prediction directions. For example, one of the motion differences and one of the prediction directions may be used to determine one of multiple difference motion vectors and one of the difference motion vectors and one of the base motion candidates may be combined to determine one of the merge candidates. In some implementations, the one of the difference motion vectors and a base motion vector of the one of the base motion candidates may be combined to generate a merge motion vector.

In some implementations, the merge subgroups may be identified from the merge candidate list based on the base motion candidates. The merge candidates may be determined based on the base motion candidates, the motion differences, and the prediction directions. In addition, the motion differences and the prediction directions may be used to determine the difference motion vectors, so the merge candidates may be determined based on the base motion candidates and the difference motion vectors. Therefore, the merge subgroups may be directly determined based on the base motion candidates. The number of the base motion candidates may be equal to the number of the merge subgroups. Thus, the numbers of the merge candidates in the merge subgroups may be determined based on the number of the difference motion vectors.

In some implementations, when one of the base motion candidates is a uni-prediction candidate, the number of the merge candidates in the merge subgroup corresponding to the one of the base motion candidates may be equal to the number of the difference motion vectors. For example, the number of the motion differences may be equal to 6 and the number of the prediction directions may be equal to 16. Thus, the number of the merge candidates in the merge subgroup corresponding to a uni-prediction candidate may be equal to 96.

In some implementations, when one of the base motion candidates is a bi-prediction candidate, the number of the merge candidates determined based on one of the base motion candidates and one of the difference motion vectors may be equal to three. Two of the three merge candidates may be a uni-prediction candidates respectively corresponding to one of a first reference image list L0 and a second reference image list L1, and the last of the three merge candidates may be a bi-prediction candidate corresponding to both of the first reference image list L0 and the second reference image list L1. Thus, when one of the base motion candidates is bi-prediction candidate, the number of the merge candidates in the merge subgroup corresponding to the one of the base motion candidates may be equal to a product of the number of the difference motion vectors and 3. For example, the number of the merge candidates in the merge subgroup corresponding to a bi-prediction candidate may be equal to 288. In some implementations, since each of the base motion candidates may be one of the uni-prediction candidate or the bi-prediction candidate, a maximum of the numbers of the merge candidates in the merge subgroups determined based on the number of the difference motion vectors may be equal to the number N.

In some implementations, when the bitstream is generated by the encoder module 114, the one or more merge indices may include only one merge prediction index corresponding to one of the merge candidate indices for indicating the prediction mode in the second merge candidate list in the method/process 400. When each of the merge subgroups in the method/process 400 only selects K of the merge candidates into the second merge candidate lists, the merge prediction index may be used to determine which one of the merge subgroups includes the selected one of the merge candidates. For example, when K is equal to three and the merge prediction index is equal to seven, the prediction mode may be included in a third one of the merge subgroups since seven is greater than a product of 3 and 2. Thus, when the decoder module 124 receives the merge prediction index, the decoder module 124 may determine the selected one of the merge subgroups including the prediction mode based on the merge prediction index.

In some implementations, when the bitstream is generated by the encoder module 114, the one or more merge indices may include a first one of the merge indices indicating which one of the merge subgroups includes the prediction mode and a second one of the merge indices indicating which one of the merge candidates in the indicated merge subgroup is the selected one of the multiple merge candidates. The first merge index may be a merge subgroup index for determining the selected one of the merge subgroups and the second merge index may be a subgroup candidate index for determining the prediction mode in the selected one of the merge subgroups.

Referring back to FIG. 5, at block 530, the decoder module 124 determines multiple cost values each corresponding to one of the merge candidates in the selected one of the merge subgroups.

With reference to FIG. 1 and FIG. 2, the decoder module 124 may calculate the cost value for each of the merge candidates in the selected one of the merge subgroups based on a template matching. The decoder module 124 may determine a reference block for each of the merge candidates in the selected one of the merge subgroups and further determine a reference template region for each of the reference blocks. In addition, the decoder module 124 may determine a block template region neighboring the block unit. The decoder module 124 may compare the reference template regions with the block template region for determining the cost values of the merge candidates in the selected one of the merge subgroups.

In some implementations, since the decoder module 124 may have determined which one of the merge subgroups includes the prediction mode, it may be unnecessary to determine the cost value for each of the merge candidates in the merge candidate list. In order to decode the bitstream more efficiently, the decoder module 124 may determine the cost value for each of the merge candidates only in the selected one of the merge subgroups.

In some implementations, the block template region may include a first neighboring region located above the block unit and a second neighboring region located at the left side of the block unit. Each of the reference template regions may neighbor a corresponding one of the reference blocks and include a first reference region located above a corresponding one of the reference blocks and a second reference region located at the left side of the corresponding one of the reference blocks. In order to compare each of the reference template regions with the block template region, a reference region size of the reference template regions may be identical to a block region size of the block template region. The block template region may include multiple first reconstructed samples predicted and reconstructed prior to predicting the block unit. Each of the reference template regions may include multiple second reconstructed samples predicted and reconstructed prior to predicting the block unit. The number of the first reconstructed samples may be equal to the number of the second reconstructed samples in each of the reference template regions.

In some implementations, the decoder module 124 may compare each of the reference template regions with the block template region by using a cost function to determine the cost values of the merge candidates in the selected one of the merge subgroups. The decoder module 124 may determine the cost values by comparing the second reconstructed samples in each of the reference template regions with the first reconstructed samples based on the cost function. The cost function may include, but not be limited to, Sum of Absolute Difference (SAD), Sum of Absolute Transformed Difference (SATD), Mean Absolute Difference (MAD), Mean Squared Difference (MSD), and Structural SIMilarity (SSIM). It should be noted that any cost function may be used without departing from this disclosure.

In some implementations, the cost value for each of the merge candidates in the selected one of the merge subgroups is a template matching cost value determined based on the first reconstructed samples in the neighboring regions of the block template region neighboring the block unit and the second reconstructed samples in the reference template region neighboring a corresponding one of the reference blocks determined based on a corresponding one of the merge candidates in the selected one of the merge subgroups.

At block 540, the decoder module 124 determines an arrangement of the merge candidates in the selected one of the merge subgroups based on the cost values.

With reference to FIG. 1 and FIG. 2, the decoder module 124 may reorder the selected one of the merge subgroups based on the cost values of the merge candidates in the selected one of the merge subgroups. In some implementations, the merge candidates in the selected one of the merge subgroups may be reordered in an ascending order or a descending order of the cost values of the merge candidates in the selected one of the merge subgroups.

In some implementations, before the arrangement is determined based on the cost values, the merge candidates in the selected one of the merge subgroups may be ordered based on arbitrary rules. For example, the merge candidates in the selected one of the merge subgroups may be ordered based on an order in which the merge candidates are added into the merge candidate list.

In some implementations, the merge candidates in the selected one of the merge subgroups may be reordered in the ascending order of the cost values of the merge candidates in the selected one of the merge subgroups. Thus, when the cost value of a specific one of the merge candidates included in the selected one of the merge subgroups is less than the cost values of the other merge candidates in the selected one of the merge subgroups, the specific merge candidate may be moved forward to be a first merge candidate in the selected one of the merge subgroups based on the arrangement. In order words, the specific merge candidate may be moved to be a first merge candidate in the selected one of the merge subgroups when the cost value of the specific merge candidate in the selected one of the merge subgroups is the minimum of the cost values in the selected one of the merge subgroups.

In some implementations, the arrangement may be further determined based on a diversity criterion. The decoder module 124 may determine a difference value between two of the cost values selected from two neighboring ones of the merge candidates in the selected one of the merge subgroups. When the difference value is less than or equal to a diversity threshold, the last one of the two neighboring ones of the merge candidates may be moved backward. For example, the relation between the four of the cost values is CV4>CV2>CV1>CV3, and the difference between two of the cost values CV1 and CV3 is less than the diversity threshold. Thus, the merge candidates MC1 may be moved backward in the selected one of the merge subgroups. Therefore, the arrangement of the specific merge candidates may be changed from the original order of the four merge candidates MC1, MC2, MC3, and MC4 to the new order of the four merge candidates MC3, MC2, MC1, and MC4.

In some implementations, the decoder module 124 may identify the merge subgroups from the merge candidate list based on the base motion candidates. Since the motion differences and the prediction directions may be used to determine the difference motion vectors, the merge candidates may be determined based on the base motion candidates and the difference motion vectors. Therefore, the selected one of the merge subgroups may directly correspond to a selected one of the base motion candidates. In other words, the arrangement may be determined for the difference motion vectors. Therefore, the decoder module 124 may determine the arrangement of the difference motion vectors for the selected one of the base motion candidates.

In some implementations, in order to determine the same arrangement of the selected one of the merge subgroups in the encoder module 114 and the decoder module 124, a first cost calculation method for determining multiple of first cost values of the merge candidates in the first merge candidate list in the method/process 400 may be identical to a second cost calculation method for determining the cost values of the merge candidates in the selected one of the merge subgroups in the method/process 500. In addition, a first arrangement determination method for determining the arrangement of the merge candidates in each of the merge subgroups in the method/process 400 may be identical to a second arrangement determination method for determining the arrangement of the merge candidates in the selected one of the merge subgroups in the method/process 500.

At block 550, the decoder module 124 selects, from the selected one of the merge subgroups based on a second one of the one or more merge indices, one of a first K merge candidates of the merge candidates ordered based on the arrangement.

With reference to FIG. 1 and FIG. 2, the decoder module 124 may select, based on the second one of the one or more merge indices, one of the merge candidates ordered based on the arrangement from the selected one of the merge subgroups. The second one of the one or more merge indices may indicate the prediction mode of the block unit from the first K of the merge candidates ordered based on the arrangement in the selected one of the merge subgroups. In some implementations, a second value of the number K is a second positive integer less than N.

In some implementations, since the decoder module 124 may select the prediction mode from the selected one of the merge subgroups based on the second one of the one or more merge indices, an index value of the second one of the one or more merge indices may be within an index range of 0 to K−1. Therefore, the merge candidates arranged after a K-th merge candidate ordered by the arrangement in the selected one of the multiple merge subgroups is excluded from selecting the prediction mode since the index value of the second one of the one or more merge indices may not be greater than K−1.

In some implementations, the first one of the one or more merge indices may be used to determine the selected one of the merge subgroups. Thus, an index value of the first one of the one or more merge indices may be within an index range of 0 to G−1 since the number of the merge subgroups is equal to the number G. Therefore, the first one of the one or more merge indices may be different from the second one of the one or more merge indices.

In some implementations, the decoder module 124 may determine a selected one of the difference motion vectors based on the second one of the one or more mode indices, and then determine the prediction mode based on the selected one of the difference motion vectors and the selected one of the base motion candidates.

In some implementations, when the bitstream is generated by the encoder module 114, the one or more merge indices may include only one merge prediction index corresponding to one of the merge candidate indices for indicating the prediction mode in the second merge candidate list in the method/process 400. When each of the merge subgroups in the method/process 400 only selects K of the merge candidates into the second merge candidate lists, the merge prediction index may be used to determine which one of the merge subgroups includes the selected one of the merge candidates and further determine which one of the merge candidates in the selected one of the merge subgroups is the prediction mode. For example, when K is equal to three and the merge prediction index is equal to seven, the prediction mode may be a second one of the merge candidates included in a third one of the merge subgroups since seven is greater than a product of 3 and 2. In other words, when the decoder module 124 receives the merge prediction index for determining the prediction mode, the merge prediction index may be regarded as the first one of the one or more merge indices for indicating which one of the merge subgroups includes the prediction mode and further regarded as the second one of the one or more merge indices for indicating which one of the merge candidates in the selected one of the merge subgroups is the prediction mode. Thus, both the first one and the second one of the one or more merge indices may be the merge prediction index, so the first one of the one or more merge indices may be identical to the second one of the one or more merge indices.

Returning to FIG. 5, at block 560, the decoder module 124 reconstructs the block unit based on the selected one of the first K of the merge candidates.

With further reference to FIG. 1 and FIG. 2, the decoder module 124 may determine a prediction block based on the prediction mode and add the residual components into the prediction block to reconstruct the block unit. The decoder module 124 may reconstruct all of the other block units in the image frame for reconstructing the image frame and the video.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of encoding video data by an electronic device, the method comprising:
   receiving the video data;
   determining a block unit from an image frame included in the video data;
   determining, for the block unit, a first merge candidate list including a plurality of merge candidates;
   identifying a plurality of merge subgroups from the first merge candidate list, wherein a number of the plurality of merge candidates in each of the plurality of merge subgroups is equal to or less than N, N being a first positive integer;
   determining a plurality of first cost values, each corresponding to one of the plurality of merge candidates;
   determining an arrangement of the plurality of merge candidates in each of the plurality of merge subgroups based on the plurality of first cost values;
   determining a second merge candidate list by selecting, from each of the plurality of merge subgroups, a first K merge candidates of the plurality of merge candidates ordered based on the arrangements, K being a second positive integer less than N;
   determining a plurality of second cost values, each corresponding to one of the plurality of merge candidates in the second merge candidate list, wherein the plurality of second cost values is different from the plurality of first cost values;
   selecting one of the plurality of merge candidates in the second merge candidate list to predict the block unit, wherein the selected one of the plurality of merge candidates is determined based on the plurality of second cost values;
   determining one or more merge indices for indicating the selected one of the plurality of merge candidates; and
   encoding the one or more merge indices into a bitstream based on the selected one of the plurality of merge candidates.

2. The method according to claim 1, wherein each of the plurality of first cost values is a template matching cost value determined based on a plurality of first reconstructed samples in a plurality of neighboring regions that is neighboring the block unit and a plurality of second reconstructed samples that is determined based on a corresponding one of the plurality of merge candidates.

3. The method according to claim 1, wherein the plurality of merge candidates in each of the plurality of merge subgroups is ordered in an ascending order of the plurality of first cost values.

4. The method according to claim 1, wherein each of the plurality of second cost values is determined based on the block unit and a plurality of third reconstructed samples that is determined based on a corresponding one of the plurality of merge candidates.

5. The method according to claim 1, wherein:
   a first one of the one or more merge indices indicates which one of the plurality of merge subgroups includes the selected one of the plurality of merge candidates, and
   a second one of the one or more merge indices indicates which one of the plurality of merge candidates is the selected one of the plurality of merge candidates in the one of the plurality of merge subgroups.

6. A method of decoding a bitstream by an electronic device, the method comprising:
   receiving the bitstream;
   determining a block unit from an image frame and one or more merge indices of the block unit according to the bitstream;
   selecting, based on a first one of the one or more merge indices, one of a plurality of merge subgroups identified from a merge candidate list of the block unit, wherein:
      each of the plurality of merge subgroups includes a plurality of merge candidates, and
      a number of the plurality of merge candidates in each of the plurality of merge subgroups is equal to or less than N, N being a positive integer;
   determining a plurality of first cost values, each corresponding to one of the plurality of merge candidates in the selected one of the plurality of merge subgroups;
   determining an arrangement of the plurality of merge candidates in the selected one of the plurality of merge subgroups based on the plurality of first cost values;
   selecting, from the selected one of the plurality of merge subgroups based on a second one of the one or more merge indices, one of a first K merge candidates of the plurality of merge candidates ordered based on the arrangement, K being a second positive integer less than N, wherein:
      the selected one of the first K of the plurality of merge candidates is included in a second merge candidate list, the second merge candidate list determined by selecting, from each of the plurality of merge subgroups, the first K merge candidates of the plurality of merge candidates,
      the selected one of the first K of the plurality of merge candidates is determined based on a plurality of second cost values, each corresponding to one of the plurality of merge candidates in the second merge candidate list, the plurality of second cost values is different from the plurality of first cost values, and the one or more merge indices are determined for indicating the selected one of the first K of the plurality of merge candidates; and reconstructing the block unit based on the selected one of the first K of the plurality of merge candidates.

7. The method according to claim 6, wherein each of the plurality of first cost values is a template matching cost value determined based on a plurality of first reconstructed samples in a plurality of neighboring regions that is neighboring the block unit and a plurality of second reconstructed samples that is determined based on a corresponding one of the plurality of merge candidates in the selected one of the plurality of merge subgroups.

8. The method according to claim 6, wherein the plurality of merge candidates in the selected one of the plurality of merge subgroups is ordered in an ascending order of the plurality of first cost values.

9. The method according to claim 6, wherein an index value of the second one of the one or more merge indices is within an index range of 0 to K−1.

10. The method according to claim 6, wherein the plurality of merge candidates that is arranged after a K-th merge candidate in the arrangement of the selected one of the plurality of merge subgroups is excluded from the selecting.

11. The method according to claim 6, wherein the first one of the one or more merge indices is identical to, or different from, the second one of the one or more merge indices.

12. An electronic device for decoding a bitstream, the electronic device comprising:

at least one processor; and one or more non-transitory computer-readable media coupled to the at least one processor and storing one or more computer-executable instructions that, when executed by the at least one processor, cause the electronic device to:

receive the bitstream;

determine a block unit from an image frame and one or more merge indices of the block unit according to the bitstream;

select, based on a first one of the one or more merge indices, one of a plurality of merge subgroups identified from a merge candidate list of the block unit, wherein:

each of the plurality of merge subgroups includes a plurality of merge candidates, and a number of the plurality of merge candidates in each of the plurality of merge subgroups is equal to or less than N, N being a positive integer;

determine a plurality of first cost values, each corresponding to one of the plurality of merge candidates in the selected one of the plurality of merge subgroups;

determine an arrangement of the plurality of merge candidates in the selected one of the plurality of merge subgroups based on the plurality of first cost values;

select, from the selected one of the plurality of merge subgroups based on a second one of the one or more merge indices, one of a first K merge candidates of the plurality of merge candidates ordered based on the arrangement, K being a second positive integer less than N, wherein the selected one of the first K of the plurality of merge candidates is included in a second merge candidate list, the second merge candidate list determined by selecting, from each of the plurality of merge subgroups, the first K merge candidates of the plurality of merge candidates, the selected one of the first K of the plurality of merge candidates is determined based on a plurality of second cost values, each corresponding to one of the plurality of merge candidates in the second merge candidate list, the plurality of second cost values is different from the plurality of first cost values, and the one or more merge indices are determined for indicating the selected one of the first K of the plurality of merge candidates; and reconstruct the block unit based on the selected one of the first K of the plurality of merge candidates.

13. The electronic device according to claim 12, wherein each of the plurality of first cost values is a template matching cost value determined based on a plurality of first reconstructed samples in a plurality of neighboring regions that is neighboring the block unit and a plurality of second reconstructed samples that is determined based on a corresponding one of the plurality of merge candidates in the selected one of the plurality of merge subgroups.

14. The electronic device according to claim 12, wherein the plurality of merge candidates in the selected one of the plurality of merge subgroups is ordered in an ascending order of the plurality of first cost values.

15. The electronic device according to claim 12, wherein an index value of the second one of the one or more merge indices is within an index range of 0 to K−1.

16. The electronic device according to claim 12, wherein the plurality of merge candidates that is arranged after a K-th merge candidate in the arrangement of the selected one of the plurality of merge subgroups is excluded from the selecting.

17. The electronic device according to claim 12, wherein the first one of the one or more merge indices is identical to, or different from, the second one of the one or more merge indices.

* * * * *